(12) United States Patent
Channel

(10) Patent No.: US 9,109,541 B2
(45) Date of Patent: Aug. 18, 2015

(54) LOCK FOR A TRANSLATING SLEEVE OF A NACELLE

(71) Applicant: Rohr, Inc., Chula Vista, CA (US)

(72) Inventor: Martin Colin Channel, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 496 days.

(21) Appl. No.: 13/664,993

(22) Filed: Oct. 31, 2012

(65) Prior Publication Data
US 2014/0116024 A1    May 1, 2014

(51) Int. Cl.
*F02K 1/76* (2006.01)
*F02K 1/32* (2006.01)
*F02K 1/72* (2006.01)

(52) U.S. Cl.
CPC . *F02K 1/766* (2013.01); *F02K 1/32* (2013.01); *F02K 1/72* (2013.01); *Y02T 50/671* (2013.01)

(58) Field of Classification Search
CPC .............. F02K 1/32; F02K 1/72; F02K 1/766
USPC ............................................ 60/226.2, 39.091
See application file for complete search history.

(56) References Cited

U.S. PATENT DOCUMENTS

| 6,021,636 A | * | 2/2000 | Johnson et al. ............... 60/226.2 |
| 2003/0024236 A1 | * | 2/2003 | Lymons et al. ............... 60/226.2 |

* cited by examiner

*Primary Examiner* — Phutthiwat Wongwian
*Assistant Examiner* — Marc Amar
(74) *Attorney, Agent, or Firm* — Snell & Wilmer L.L.P.

(57) ABSTRACT

A locking system for a cascade thrust reverser on a bypass turbofan is disclosed. The locking system includes a translating sleeve configured to move between a stowed position and a deployed position. A lock member is mounted to a beam and has a locking portion which contacts a roller on the translating sleeve to retract the locking portion when the translating sleeve moves to the stowed position.

20 Claims, 12 Drawing Sheets

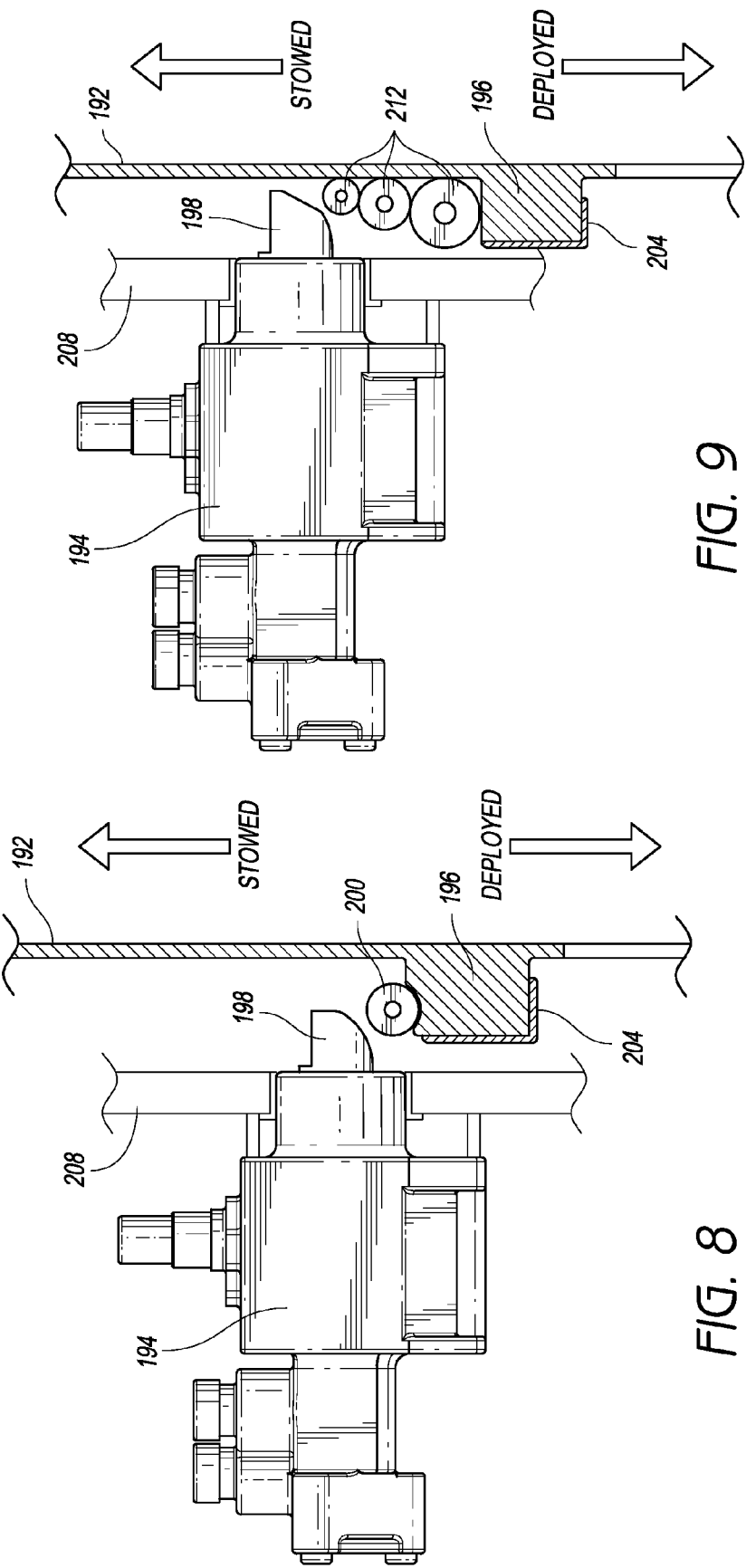

LOCK FOR A TRANSLATING SLEEVE OF A NACELLE

BACKGROUND

1. Field

This application relates generally to engine nacelles.

2. Description of the Related Technology

In general, a nacelle is a portion of an aircraft's propulsion system. More specifically, a nacelle is a casing or housing which holds an engine and/or other equipment on an aircraft. Nacelles are often coupled to an underside of a wing, for example, by a pylon.

A nacelle surrounds the jet engine and includes a thrust reverser. The thrust reverser reduces the aircraft's speed after landing by reversing thrust and redirecting exhaust from the engine to flow in a forward direction. The thrust reverser includes a translating sleeve defined by one or more outer cowl panels and tracks mounted within the nacelle that support the translating sleeve.

SUMMARY

The devices, systems, and methods of the present invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "DETAILED DESCRIPTION OF THE PREFERRED EMBODIMENTS" one of ordinary skill in the art will appreciate how the features of this invention provide advantages as compared to existing nacelles.

One aspect of the present invention is a locking system for a cascade thrust reverser on a bypass turbofan. The locking system comprises a translating sleeve configured to move between a stowed position and a deployed position and a lock member mounted to a beam and having a locking portion. The locking portion is movable between an extended position and a retracted position. The locking portion is engageable with the translating sleeve to lock the translating sleeve in the stowed position when the locking portion is in the extended position and is disengageable from the translating sleeve to allow the translating sleeve to move toward the deployed position when the locking portion is in the retracted position. The system further includes a roller disposed so as to contact the locking portion when the locking portion is in the extended position and the translating sleeve moves from the deployed position to the stowed position.

Another aspect is a cascade type thrust reverser for an air duct of a turbofan engine that includes a beam, a translating sleeve slidingly engaged with the beam so as to slide relative to the beam between a deployed position and a stowed position, and a lock member supported by the beam and having a locking portion. The locking portion is movable between an extended position and a retracted position. The thrust reverser further includes a member mounted to the translating sleeve so as to rotate about a fixed axis and retract the locking portion when the locking portion contacts the member and the translating sleeve slides towards the stowed position.

Another aspect is a cascade type thrust reverser for an air duct of a turbofan engine that includes a fixed member, a translating member configured to move with respect to the fixed member between a deployed position and a stowed position, and a lock member mounted to one of the fixed member and the translating member. The lock member has a locking portion which is movable between a lock position and an unlock position. The thrust reverser further includes a member having a rotational axis and is mounted to the other one of the fixed member and the translating member. The member is configured to rotate and retract the locking member when the locking portion contacts the member and the translating member moves towards the stowed position.

Further aspects, features and advantages of the present invention will become apparent from the detailed description that follows.

BRIEF DESCRIPTION OF THE DRAWINGS

These and other features, aspects, and advantages of the present invention will now be described in connection with embodiments of the present invention, in reference to the accompanying drawings. The illustrated embodiments, however, are merely examples and are not intended to limit the invention. The various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus, device, system, method, or any other illustrated component or process.

FIG. 8 is similar to FIG. 7A except that the roller has a smaller diameter and is disposed at a slightly different location relative to the lock stop.

FIG. 9 is similar to FIG. 8 except that the single roller has been replaced with a plurality of rollers having increasing diameters.

DETAILED DESCRIPTION OF THE PREFERRED EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Figure 1:
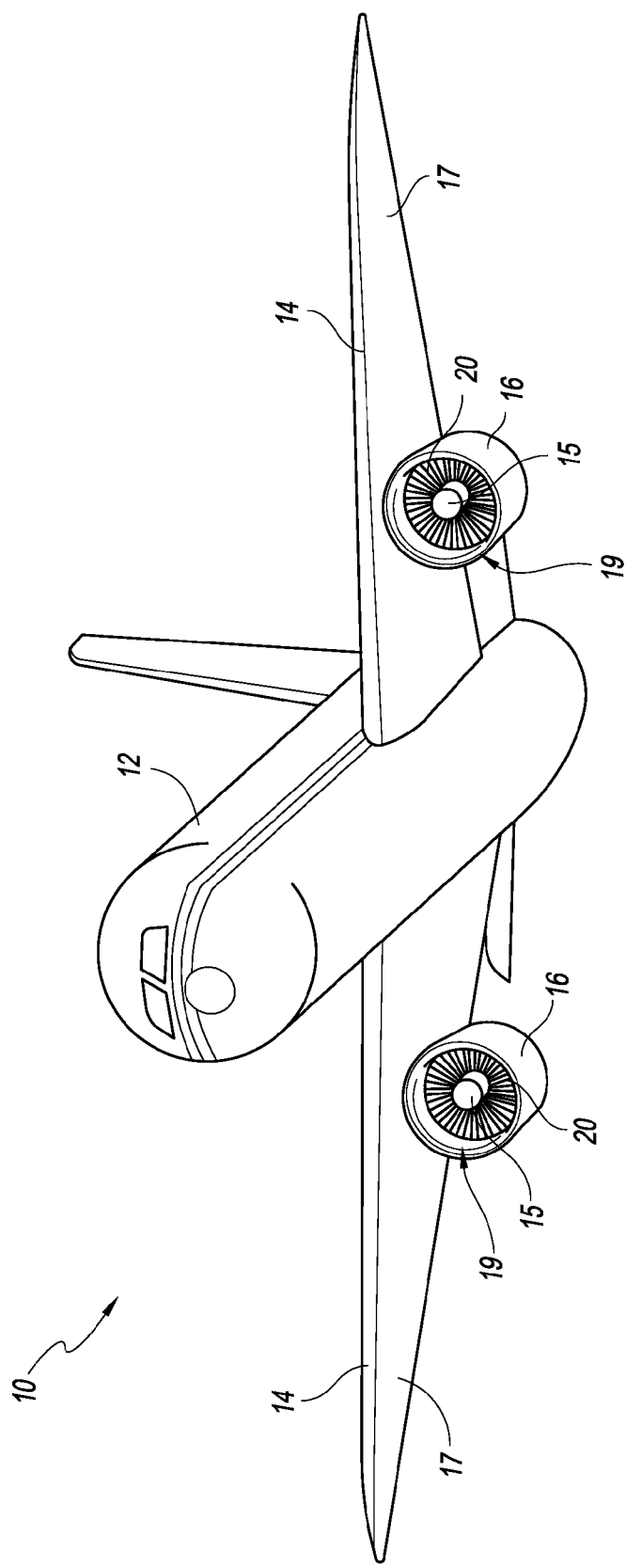
FIG. 1 is a perspective view of an aircraft including a pair of nacelles located on the undersides of the wings.

FIG. 1 is a perspective view of an aircraft 10 having a fuselage 12 and a pair of wings 14 extending laterally from the fuselage 12. A nacelle 16 is coupled to an underside 17 of each wing 14. Although not illustrated in FIG. 1, in some embodiments, each nacelle 16 is coupled to a wing 14 by a pylon, or any other suitable structure capable of coupling a load to a wing.

Each nacelle 16 houses an aircraft engine 15, for example, a high bypass ratio engine. A high bypass ratio engine 15 receives air through a fan 20 disposed near an inlet 19 of the nacelle 16, combusts the received air with fuel within a combustion chamber, and provides an exhaust jet through a rear-facing nozzle or outlet to propel the aircraft 10 in a forward direction. Additionally, high bypass ratio engines also receive a substantial amount of air through the inlet 19 of the nacelle 16 that is passed over, or that bypasses, the engine 15 to provide additional thrust. The bypass air passes through an air duct (sometimes referred to as a "bypass duct") and is combined with the exhaust jet which improves fuel efficiency and engine noise. In some embodiments, the nacelle 16 can include a variable area fan nozzle cowling (VAFN) configured to vary an outlet area through which the exhaust jet and bypass air can pass through.

To assist in the description of the nacelles 16 described below with reference to the figures, the following coordinate terms are used, consistent with the coordinate axes illustrated. A "longitudinal axis" is generally parallel to an axis of the nacelle that extends between the inlet 19 and outlet of the nacelle. A "lateral axis" is normal to the longitudinal axis and is generally parallel to a wing 14 associated with the nacelle. A "transverse axis" extends normal to both the longitudinal and lateral axes. In addition, as used herein, "the longitudinal direction" refers to a direction substantially parallel to the longitudinal axis; "the lateral direction" refers to a direction substantially parallel to the lateral axis; and "the transverse direction" refers to a direction substantially parallel to the transverse axis.

The terms "upper," "lower," "top," "bottom," "underside," "upperside" and the like, which may be used to describe nacelles and related components in the discussion below, are used in reference to the illustrated orientation of the embodiments. For example, the term "upperside" is used to describe the portion of a nacelle that is disposed above an engine 15 housed within the nacelle. The term "underside" is used to describe the portion of the nacelle that is located below a plane that passes through the longitudinal axis of the nacelle or the portion of a wing that faces an associated nacelle. Additionally, the adverbs or adjectives "aft" and "fore" are used with reference to the rear and front sides of a nacelle, respectively. For example, the term "aft" means toward the rear or outlet of a nacelle and the term "fore" means towards the front or inlet of a nacelle. The terms "inboard" and "outboard" are used with reference to an airframe or fuselage ultimately coupled to the nacelle. For example, an "inboard" surface of a nacelle may face toward an airframe or fuselage when the nacelle is coupled to the airframe while an "outboard" surface of the nacelle may face away from the airframe or fuselage. In this way, an "inboard" side of a nacelle may be disposed between the "outboard" side of the nacelle and the fuselage when the nacelle is coupled indirectly to the fuselage, for example, via a wing.

Figure 2:
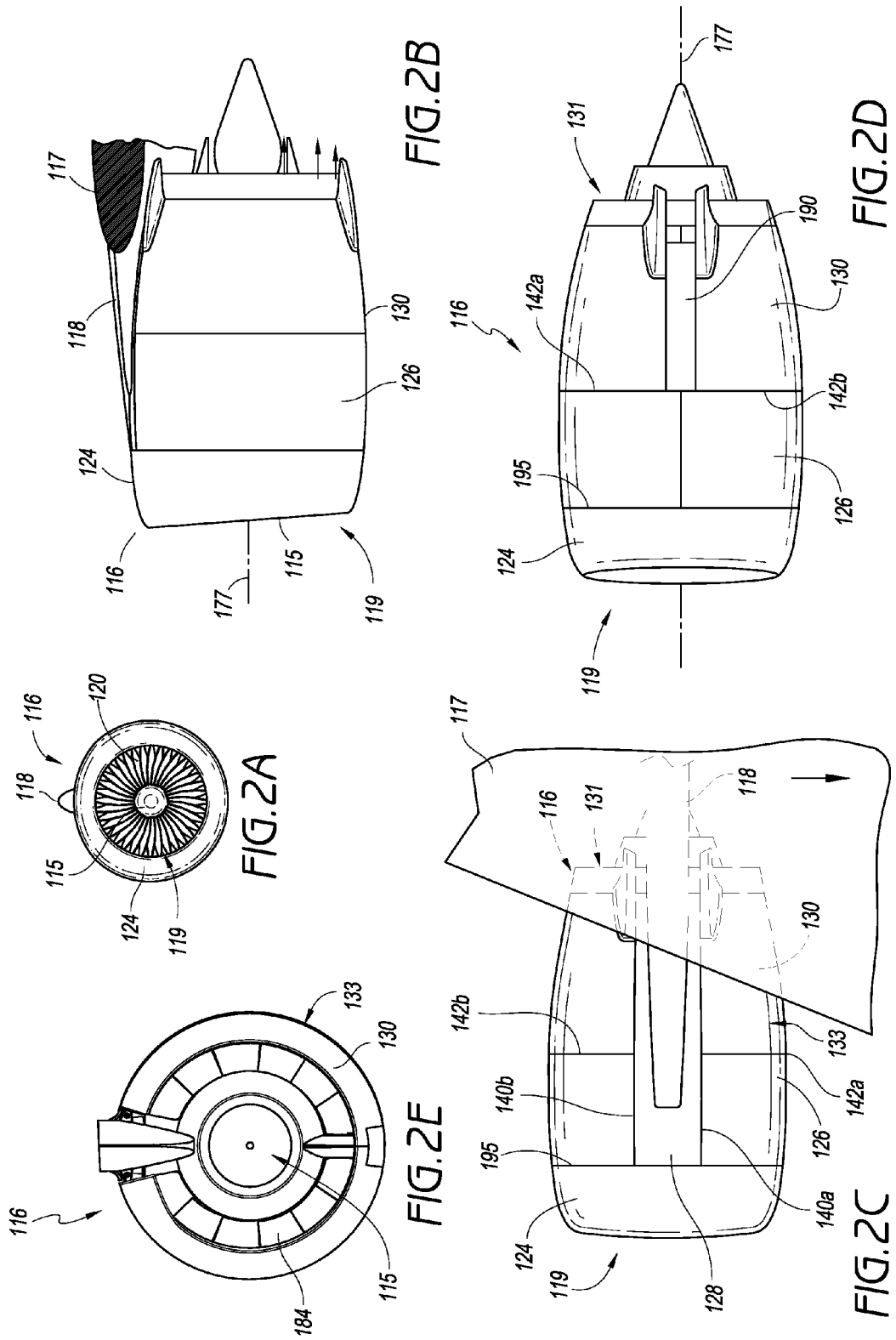
FIG. 2A is a front view of a nacelle according to a preferred embodiment.
FIG. 2B is a side view of the nacelle of FIG. 2A relative to a wing.
FIG. 2C is a top view of the nacelle of FIG. 2A relative to a wing.
FIG. 2D is a bottom view of the nacelle of FIG. 2A.
FIG. 2E is a rear view of the nacelle of FIG. 2A.

FIGS. 2A-2E illustrate an embodiment of a nacelle 116. FIG. 2A schematically depicts a front view of the nacelle 116 and an engine 115 housed therein. The engine 115 is coupled with a fan 120 that is disposed near the front side of the nacelle 116 to draw air into the nacelle 116 through an inlet 119. As described in further detail below, the air drawn in through the inlet 119 may be expelled through an outlet 131 of the nacelle 116 and/or combusted with fuel to provide a forward thrust for the aircraft. At certain times during aircraft operation, air is expelled through a thrust reverser arrangement to produce a backwards (e.g., reverse) thrust.

The nacelle 116 is coupled to the aircraft by a pylon 118 disposed on the upperside of the nacelle 116. For example, the nacelle 116 can be coupled to the underside of an aircraft wing 117 as shown in FIGS. 2B and 2C such that the engine 115 selectively provides forward and reverse thrust capabilities to the aircraft.

Still referring to FIGS. 2A-2E, the nacelle 116 has an inlet lip or noselip 124. An inlet cowling 126 and a top cowling 128 are disposed aft of the inlet lip 124. As illustrated, the inlet lip 124 can be substantially ring-shaped to define the inlet 119 of the nacelle. In some embodiments, the inlet cowling 126 defines a C-shaped portion that forms a channel with the top cowling 128 through the nacelle 116.

Some embodiments of the invention disclosed herein relate to nacelles 116 having a cascade type thrust reverser. A thrust reverser is a portion of an aircraft's jet engine nacelle 116 that reduces the aircraft's speed after landing by redirecting exhaust from the engine 115 to travel in a forward direction. For example, FIGS. 2B and 2C illustrate a side view and a top view, respectively, of a nacelle 116 that includes a cascade type thrust reverser in a forward thrust configuration.

The thrust reverser includes a translating sleeve 130, which is a panel on the external portion of the nacelle 116 that moves generally fore and aft along a longitudinal axis 177, and in combination with other components of the nacelle (e.g., blocker doors 184), directs exhaust from the bypass air duct to flow in either the fore or aft direction. As can be seen in these figures, the translating sleeve 130 is disposed adjacent to, and aft of, the inlet cowling 126. For a forward thrust configuration where air flows rearward through the air duct of the engine 115, the translating sleeve 130 resides in a stowed position in which its forward end engages a forward bulkhead of the nacelle 116. Inner wall members of the translating sleeve 130 form an outer wall of the bypass air duct. Outer wall members of the translating sleeve 130 are faired aerodynamically to the inlet cowling 126 of the engine 115.

Transverse splits 142a, 142b are disposed between the inlet cowling 126 and the translating sleeve 130. A transverse split 195 is also disposed between the inlet lip 124 and the top cowling 128 and the inlet cowling 126. Additionally, the nacelle 116 includes a pair of longitudinally extending splits 140a, 140b disposed between the top cowling 128 and the inlet cowling 126 and translating sleeve 130. In other words, the longitudinally extending splits 140a, 140b extend from the inlet lip 124 to the outlet 131.

As shown in FIG. 2C, a swept wing 117 is in closer proximity to the translating sleeve 130 on the inboard side as a function of its sweep angle relative to the longitudinal axis of the nacelle. The bottom side of the translating sleeve 130 can include a panel 190 which joins complementary halves of the translating sleeve 130. Thus, when coupled together by the panel 190, the halves of the translating sleeve 130 can translate longitudinally relative to the inlet cowling 126 together.

As shown in FIG. 2E, the nacelle 116 can include blocker doors 184 that are activated to impede (e.g., to prevent, inhibit, or reduce) the flow of air that bypasses the engine 115 and prevents such air from passing through the outlet 131 of the nacelle 116 when the nacelle 116 is in a reverse thrust configuration.

Figure 3:
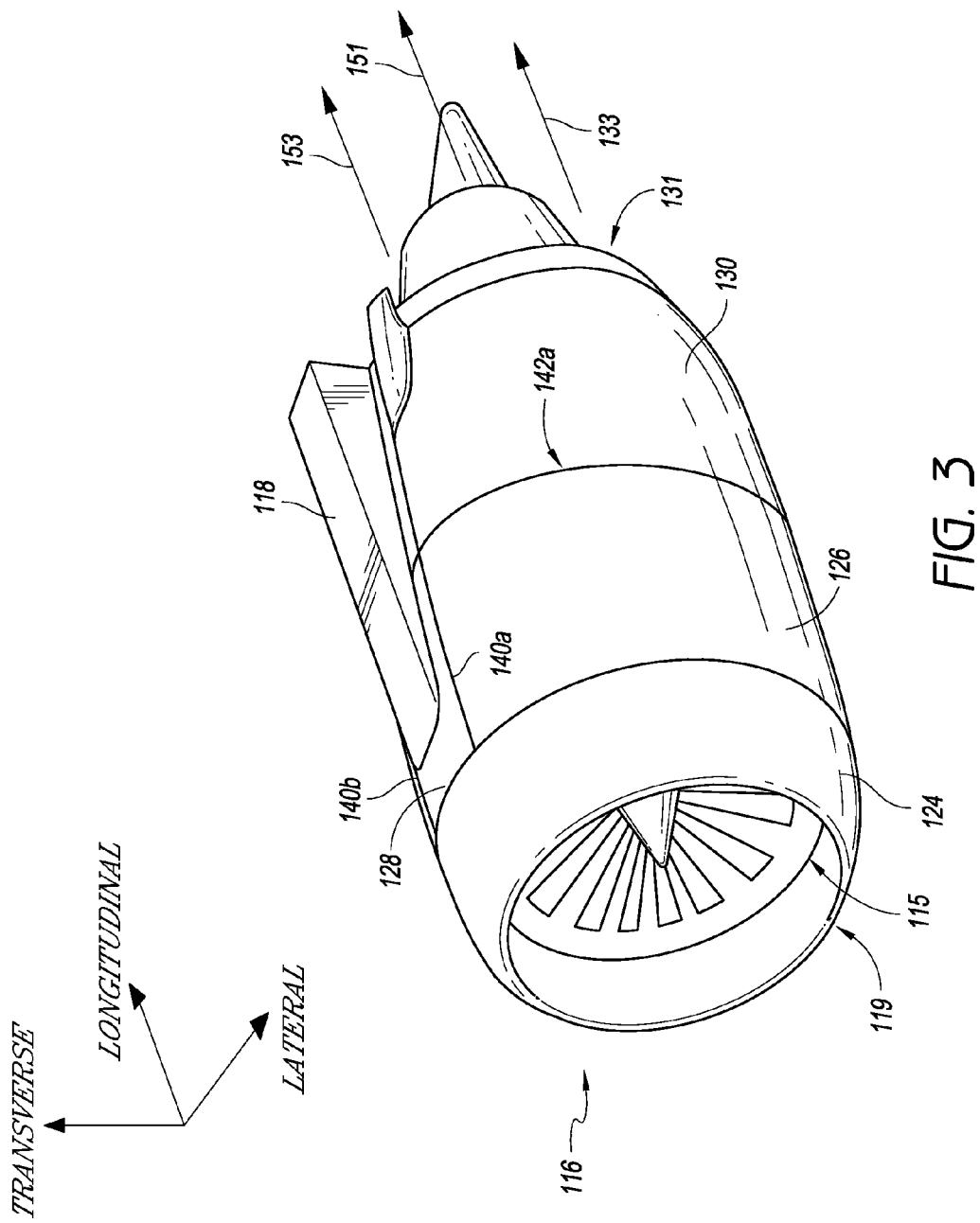
FIG. 3 is a perspective view of the nacelle of FIGS. 2A-2E in a forward thrust configuration.

FIG. 3 is a perspective view of the nacelle 116 and engine 115 of FIGS. 2A-2E in a forward thrust configuration. When in the forward thrust configuration, air passing through the bypass duct of the nacelle 116 is substantially unimpeded by blocker doors 184 such that engine exhaust 151 and bypass air 153 combine with each other and exit the nacelle 116.

Figure 4:
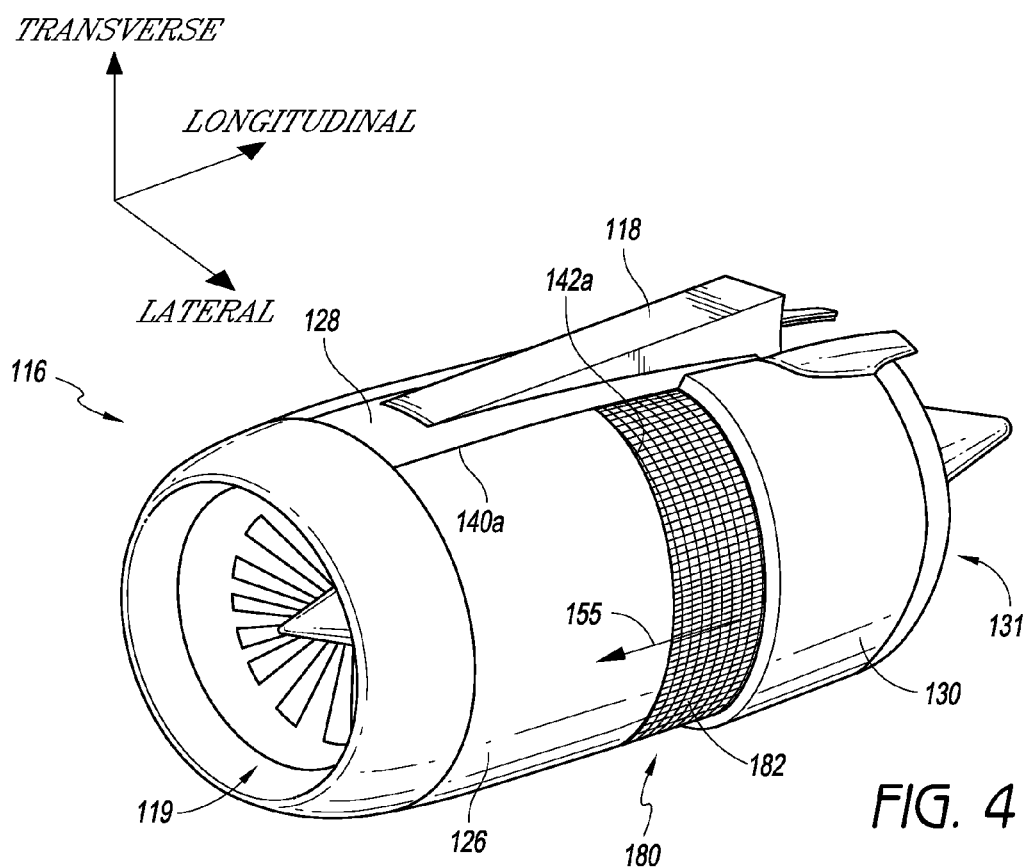
FIG. 4 is a perspective view of the nacelle of FIGS. 2A-2E showing a translating sleeve assembly in a reverse thrust configuration.

FIG. 4 shows the nacelle 116 of FIGS. 2A-2E in a reverse thrust configuration. In the reverse thrust configuration, each translating sleeve 130 is translated longitudinally away from the inlet cowling 126 as compared with the position of the translating sleeve 130 illustrated in FIG. 3 (e.g., as compared with the position of the translating sleeve 130 in the forward thrust configuration). For reverse air flow 155, each translating sleeve 130 is moved rearwardly away from the inlet cowling 126, leaving an outlet opening rearwardly of the inlet cowling 126 for air to be discharged generally radially from the bypass duct. The thrust reverser also provides for blocking of the air duct at a location rearwardly of cascades 180. One form of blocking system is a number of blocker doors 184 (see FIGS. 2E and 5) that are coupled by blocker door links to a cowling around the engine 115. When the translating sleeve 130 moves rearwardly, the linkages pivot the blocker doors 184 down to a position in which they are closed and block the air duct.

In certain embodiments, the nacelle 116 includes upper hinge beams and lower track beams for slidingly coupling to slider beams on the translating sleeve 130. The upper track beams may be affixed to the pylon 118 or strut by which the engine 115 is mounted on the aircraft 10. Each track beam includes an elongated slideway which receives a slider beam that is affixed to the translating sleeve 130. In this way relative longitudinal translation of the slider beams along the track beams moves each translating sleeve 130 between the stowed and deployed positions.

Longitudinal translation of each translating sleeve 130 to its deployed position exposes the underlying cascade 180. The cascade 180 includes a plurality of curved deflector vanes 182 disposed circumferentially about the longitudinal axis of the nacelle 116 in the outlet opening formed between the inlet cowling 126 and the forward end of the deployed translating sleeve 130. The cascade 180 redirects the air flow in the bypass air duct so that it flows outwardly and forwardly to produce a reverse thrust 155.

Figure 5:
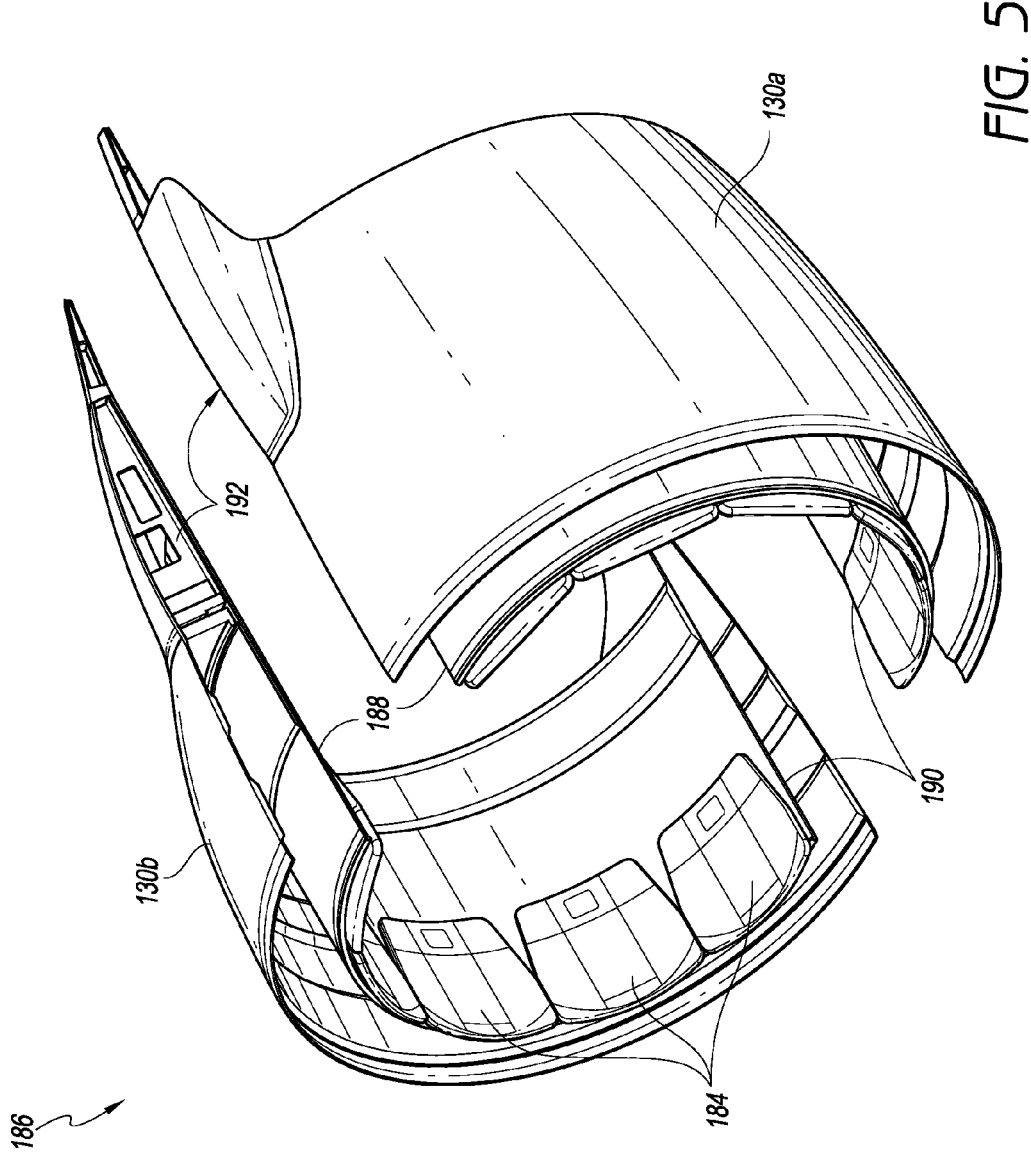
FIG. 5 is a perspective view of the translating sleeve assembly from FIG. 4 which includes a translating sleeve and one or more slider beams.

FIG. 5 is a perspective view of a translating sleeve assembly 186 which comprises the translating sleeve 130 from FIG. 4 and one or more slider beams 188, 190. Each slider beam 188, 190 is fixed to a translating sleeve closeout 192.

The translating sleeve of the thrust reverser shown in FIG. 5 includes a left translating sleeve portion 130(a) and a right translating sleeve portion 130(b). The two portions are independently supported by upper and lower track beam (not shown in FIG. 5) but preferably are commanded to move in unison. The invention is not limited to translating sleeves that include multiple portions. For example, the translating sleeve 130 may be a single unitary translating sleeve, separate translating sleeve halves that are mechanically coupled, or separate translating sleeve halves that are independently mounted (FIG. 5).

The translating sleeve 130 (or the translating sleeve portions 130(a) and 130(b)) is driven by one or more actuators between a stowed position adjacent to the inlet cowling 126 and a deployed position spaced apart axially to the rear of the inlet cowling 126. As explained above, in the forward, stowed position for normal rearward air flow through the engine air duct, the translating sleeve 130 forms the outer wall of the portion of the air duct to the rear of the inlet cowling 126. The rear part of the air duct is defined radially inwardly by a fixed barrel around the engine 115. In the rearward, deployed position of the translating sleeve 130, the cascades 180 discharge air from the air duct of the engine fan.

The blocker doors 184 reside within the inner walls of the translating sleeve 130 in the forward, stowed position of the translating sleeve 130 and are pivoted inwardly by blocker door links so as to block the air duct at a location to the rear of the cascades 180 when the translating sleeve 130 is moved to the rearward, deployed position.

To minimize the chance of a thrust reverser deploying during flight, a plurality of locking systems including locking actuators, non-locking actuators, synchronization shaft locks (also referred to as sync locks), and auto-restow systems hold the translating sleeve 130 in the stowed position. For example, one or more locks can be integrated with the linear actuators that move the translating sleeve 130 between the stowed, forward thrust position and the deployed, reverse-thrust position. To further reduce the possibility of deployment during flight (e.g., caused by damage to the locks in the case of engine rotor malfunction) one or more thrust reverser locks can be located along the longitudinal axis and in different rotor burst zones. In such a case, a malfunction of a single rotor at most will affect the locks in a single burst zone, while not affecting locks located in different rotor burst zones.

The actuator locks can utilize mechanical springs to keep the locks closed and electrical (solenoidal) or hydraulic releasing elements. Despite careful design and installation, the actuator locks are not failsafe. For example, when in the reverse thrust configuration during landing, electrical faults in the control wiring, which can be caused by incidents such as a turbine rotor burst, or a hydraulic failure, can prevent the actuator lock from being retracted. If the lock is not retracted the translating sleeve cannot be re-stowed, which would prevent the pilot from being able to abort the landing and re-ascend if such a course of action is necessary.

Figure 6A:
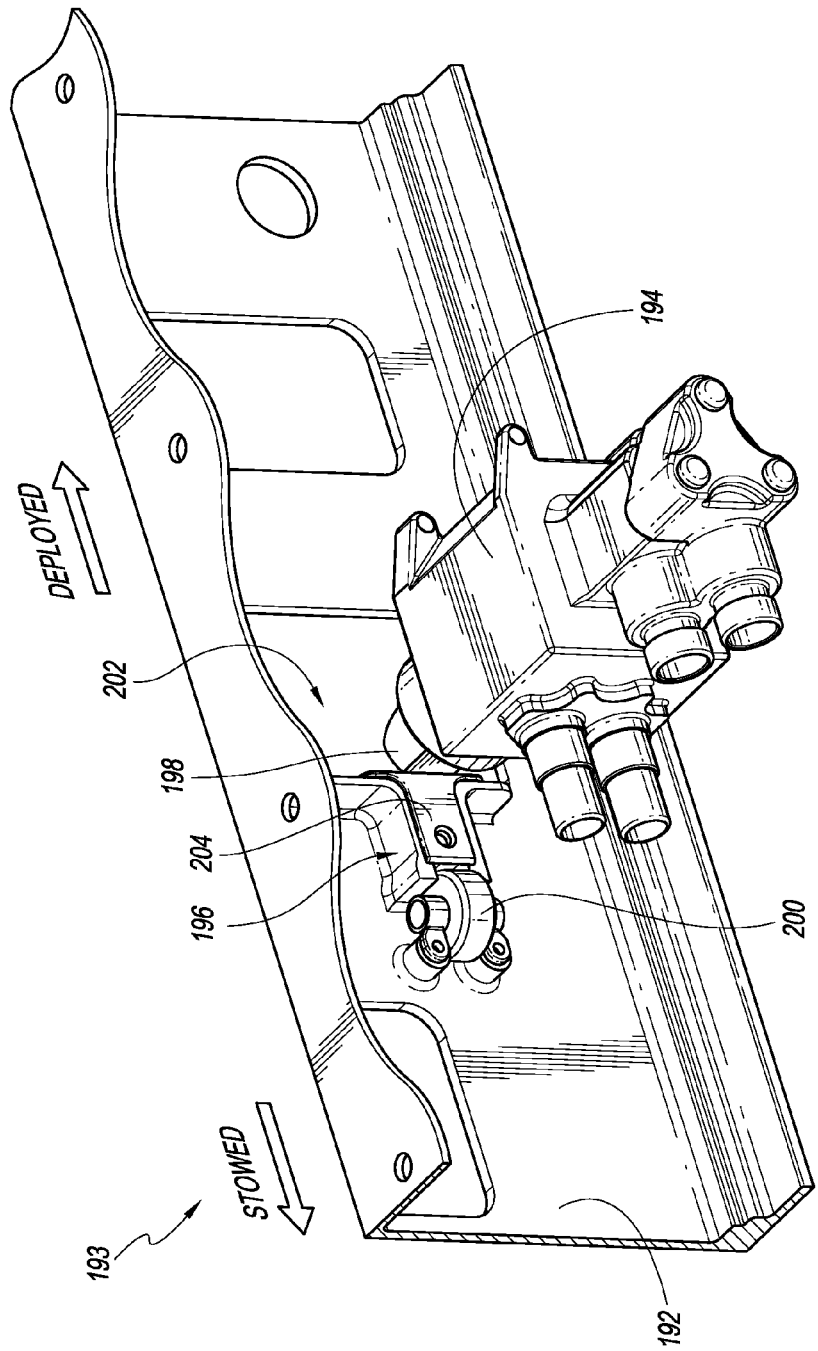
FIG. 6A is a schematic detail perspective view of a lock system for use with the translating sleeve assembly of FIG. 5 with the latch beam removed for clarity, the view showing the lock pin in the extended and locked position with the translating sleeve closeout in the stowed position.

FIG. 6A is a schematic detail perspective view of a lock system 193 for use with the translating sleeve assembly 186 of FIG. 5. The latch beam, which supports the actuator 194, has been removed for clarity. One or more lock systems 193 can be used for each translating sleeve 130. For example, a lock system 193 can be utilized with each of the track and latch beams and the corresponding slider beams 188, 190 of the translating sleeve assembly 186 (See FIG. 5). For ease of description, each of FIGS. 6A-9 illustrates the lock system 193 being used with a latch beam. However, the lock system 193 is not limited to being used with latch beams. For example, the lock system 193 can be used with an upper hinge beam, a lower track beam, an upper track beam, or any structure that is in proximity to the translating sleeve assembly 186. Thus, a skilled artisan will recognize that the lock system 193 may be used with structures other than the latch beam illustrated in FIGS. 6A-9. For ease of description, the term "beam" is used in the specification to mean any of the aforementioned structures including latch beam, upper hinge beam, lower track beam, and upper track beam.

Each lock system 193 has an actuator 194 with a lock member or pin 198 that abuts against a lock stop 196 of the respective translating sleeve closeout 192 when the actuator 194 is in its locked position as shown in FIG. 6A. The translating sleeve 130 is fixed to the translating sleeve closeout 192 and moves in unison with the translating sleeve closeout 192. When the actuator 194 of the lock system 193 is in its locked position, the extension of the lock pin 198 provides a contact surface on the lock pin 198 which abuts against the lock stop 196.

In FIG. 6A, the lock pin 198 is in the extended and locked position with the translating sleeve closeout 192 and translating sleeve 130 in the stowed position. The actuator 194 is secured to the latch beam 208 (see FIG. 7A) and includes the lock member or pin 198 that retracts to unlock, and extends to lock the translating sleeve 130 in position.

Figure 6B:
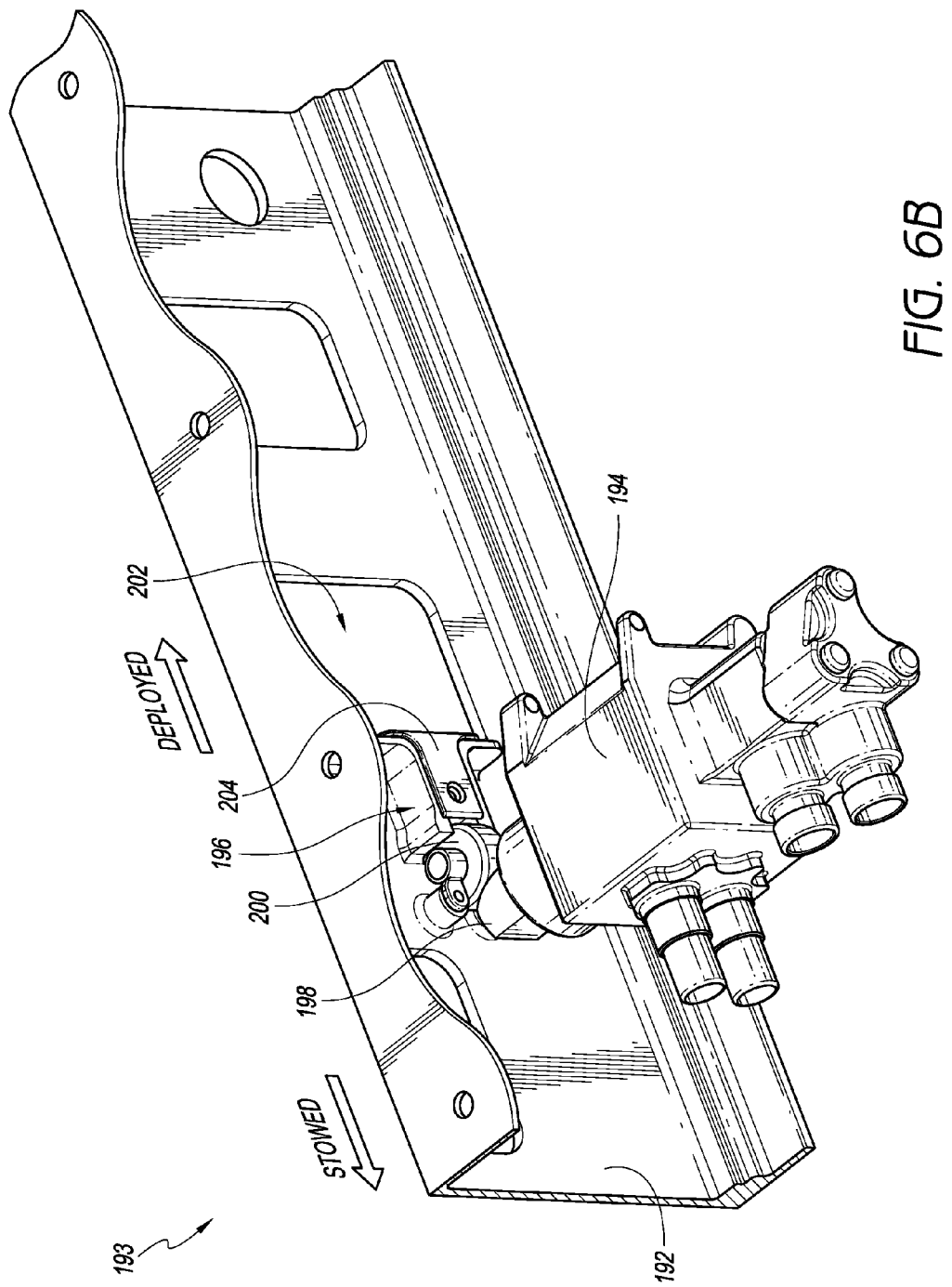
FIG. 6B is the same view as FIG. 6A except that the translating sleeve closeout has moved from the deployed position and approaches the stowed position at which point the extended lock pin comes into initial contact with a roller.

The actuator 194 includes an internal spring which biases the lock pin 198 towards the extended position. Thus, in the absence of appropriate force (e.g., hydraulic pressure) to the actuator 194, the spring will deploy the lock pin 198. In the unlikely event that there is insufficient force (hydraulic pressure) to retract the lock pin 198 to allow the translating sleeve 130 to move from a deployed position back to the stowed position as is illustrated in FIG. 6A, a rotatable roller 200 positioned on the translating sleeve closeout 192 will come in contact the lock pin 198 and mechanically retract the lock pin 198 into the actuator 194 as shown in FIG. 6B.

The roller 200 is disposed on the translating sleeve closeout 192 to contact the lock member or pin 198 when the pin 198 is in the extended position and the translating sleeve 130 moves from the deployed position to the stowed position. As each translating sleeve 130 moves to its stowed position, the roller 200 of the translating sleeve closeout 192 moves across the lock pin 198 and exerts sufficient force on the lock pin 198 to overcome the spring force exerted by the spring in the actuator 194 to force the lock pin 198 towards the retracted and unlocked position. When the translating sleeve 130 approaches its stowed position, the lock pin 198 of the actuator 194 is forced by the spring in the actuator 194 to extend and thereby abut against the lock stop 196 on the translating sleeve closeout 192 to return the actuator 194 to its lock position. The roller 200 can be made from a metal including aluminum and preferably can freely rotate about its central axis.

In certain embodiments and as shown in FIG. 6A, the translating sleeve closeout 192 includes an opening 202 which receives at least a portion of the lock pin 198 when the translating sleeve 130 is in the stowed position. Of course all embodiments need not include the opening 202. In certain embodiments, the travel of the lock pin 198 is selected so that when the lock pin 198 is extended, the lock pin 198 does not pass through the translating sleeve closeout 192. In such an embodiment, at least a portion of the lock pin 198 need only abut a portion of the lock stop 196 to lock the translating sleeve 130 in the stowed position.

In the stowed position as illustrated in FIG. 6A, the lock pin 198 abuts the lock stop 196 and extends into the opening 202 in the translating sleeve closeout 192, and in conjunction with other locks on the thrust reverser, locks the translating sleeve 130 in position. In order for the translating sleeve 130 to move to the deployed position, hydraulic pressure causes the actuator 194 to retract the lock pin 198, and the other locks on the thrust reverser are released, thereby freeing the translating sleeve 130 to slide along the rail of the track and latch beams. Depending on relative hardness of the lock pin 198 and the lock stop 196, the lock stop 196 may include a strike plate 204 disposed so as to contact the lock pin 198. For example, the strike plate 204 may be made from a metal including steel.

FIG. 6B is the same view as FIG. 6A except that the translating sleeve closeout 192 has moved from the deployed position and approaches the stowed position at which point the extended lock pin 198 comes into initial contact with the roller 200. Further movement of the translating sleeve closeout 192 in the forward (stow) direction will cause the roller 200 to rotate and gradually retract the lock pin 198. This rolling action of the roller 200 against the lock pin 198 is advantageous because it reduces wear and tear on the contacting surfaces of the roller 200 and lock pin 198 that would occur if the lock pin 198 was allowed to scrape across a non-rotating roller or other similar retraction structure. A further advantage is the loading into the structure is reduced in comparison to a lock system which includes a non-rotating roller or other similar structure because the friction loads are reduced by the rolling action.

Once the lock pin 198 is sufficiently retracted by the roller 200, the translating sleeve closeout 192 continues to move towards the stowed position with the lock pin 198 sliding across an upper surface of the strike plate 204. The roller 200 and the strike plate 204 prevent the spring in the actuator 194 from re-deploying the lock pin 198 until the lock pin 198 has slid across the entire strike plate 204 and reached the lock stop 196 or adjacent opening 202 in the translating sleeve closeout 192. Once the lock pin 198 reaches the lock stop 196, the biasing spring in the actuator 194 deploys the lock pin 198 towards the extended position to lock the translating sleeve closeout 192 and translating sleeve 130 in the stowed position.

Figure 6C:
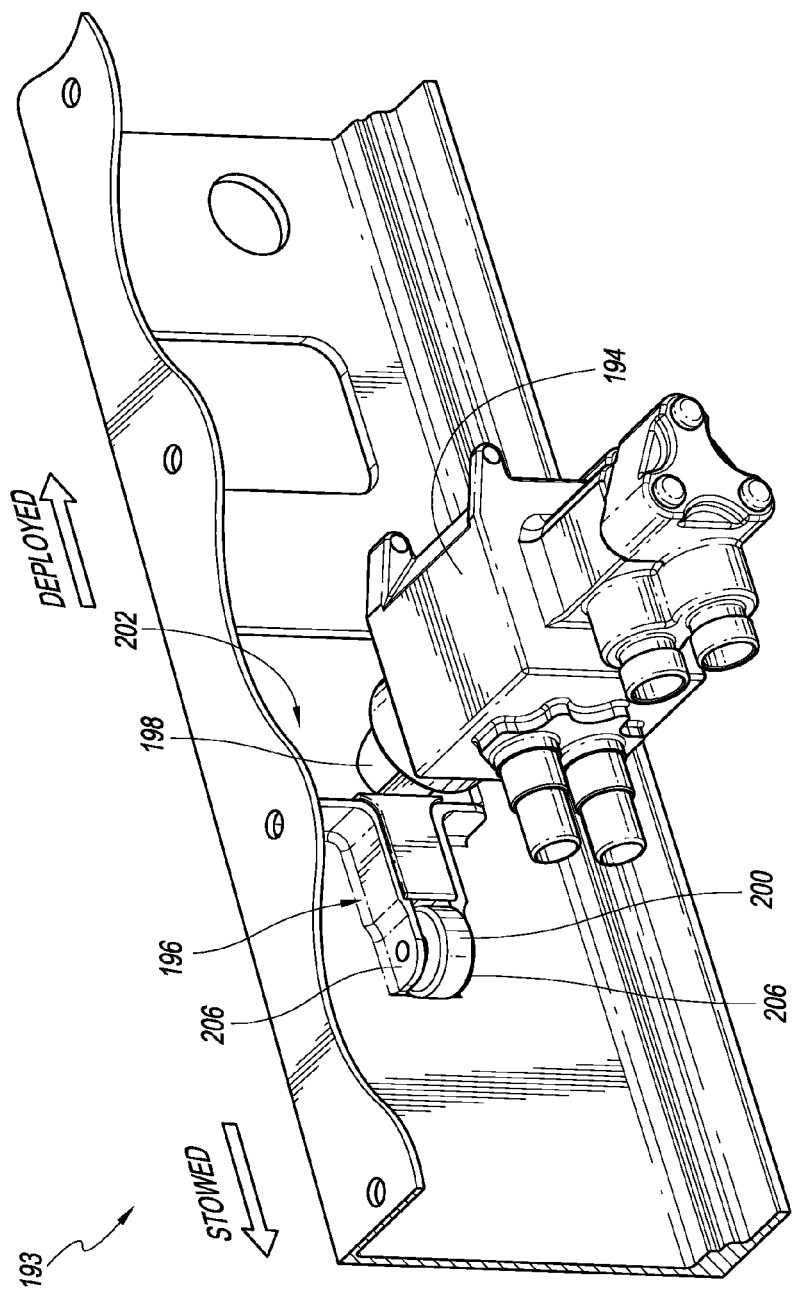
FIG. 6C is similar to FIG. 6A except that the roller is attached to the translating sleeve closeout via two opposing walls on both sides of a lock stop.

In certain embodiments, the roller 200 is the first surface contacted by the deployed lock pin 198 when the translating sleeve closeout 192 moves from the deployed position to the stowed position. Once the roller 200 is contacted by the deployed lock pin 198, further forward movement of the translating sleeve closeout 192 causes the roller 200 to rotate about its central axis. In this way the lock pin 198 need not slide across the surface of the roller 200. Of course the roller 200 need not be the first surface contacted by the deployed lock pin 198 and instead the lock pin 198 could contact a projection or protrusion extending from the translating sleeve closeout 192 at a location in front of the roller 200. FIG. 6C is similar to FIG. 6A except that the roller 200 is attached to the translating sleeve closeout 192 via two opposing walls 206 on both sides of the lock stop 196.

Figure 6D:
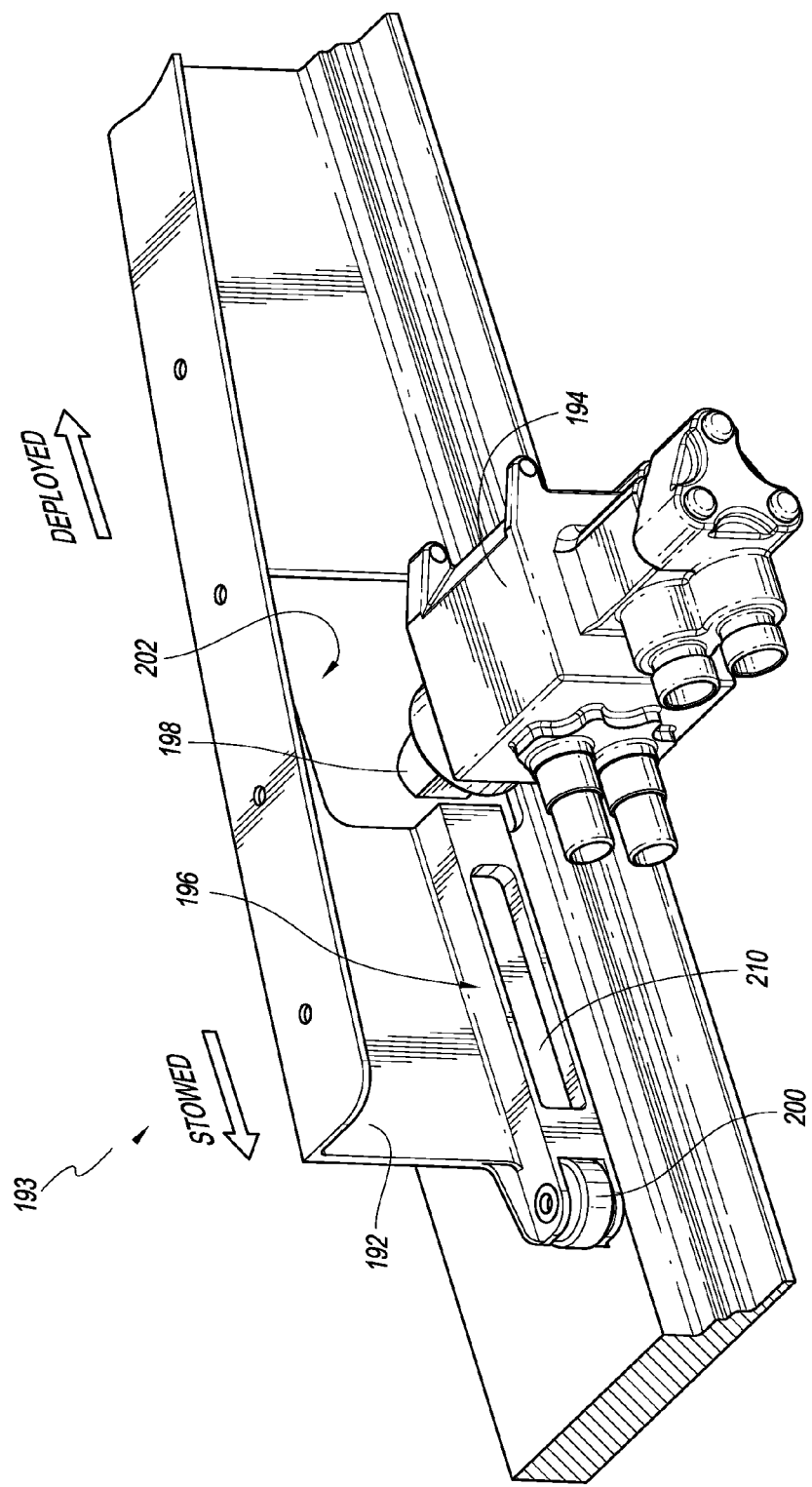
FIG. 6D is similar to FIG. 6A except that the roller is attached to the translating sleeve closeout farther away from the lock stop and opening.

FIG. 6D is similar to FIG. 6A except that the roller 200 is attached to the translating sleeve closeout 192 farther away from the lock stop 196 and opening 202. Further, the length of the lock stop 196 in FIG. 6D is increased to span the distance between the roller 200 and the opening 202. The lock stop 196 further includes a channel 210 to reduce the mass of the lock stop 196. The width of the channel 210 is selected so that when the lock pin 198 is biased towards the extended position and in contact with the lock stop 196, the lock pin 198 does not enter the channel 210 when the translating sleeve closeout 192 moves from the deployed position to the stowed position.

Figure 7B:
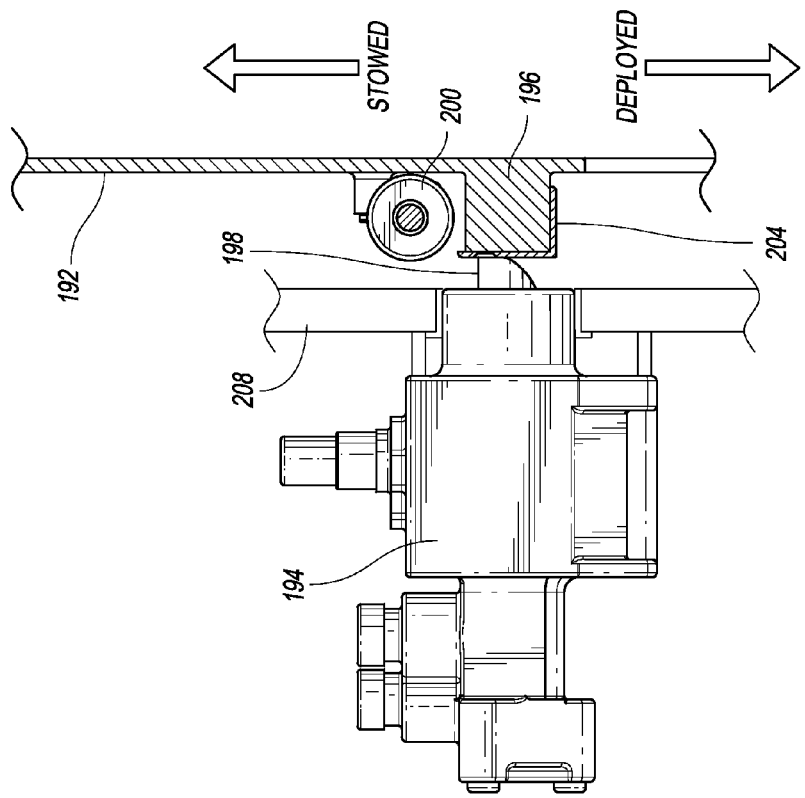
FIG. 7B is similar to FIG. 7A except that the continued movement of the translating sleeve closeout towards the stowed position has caused interference between the extend lock pin and the roller which has retracted the lock pin into the actuator.
Figure 7A:
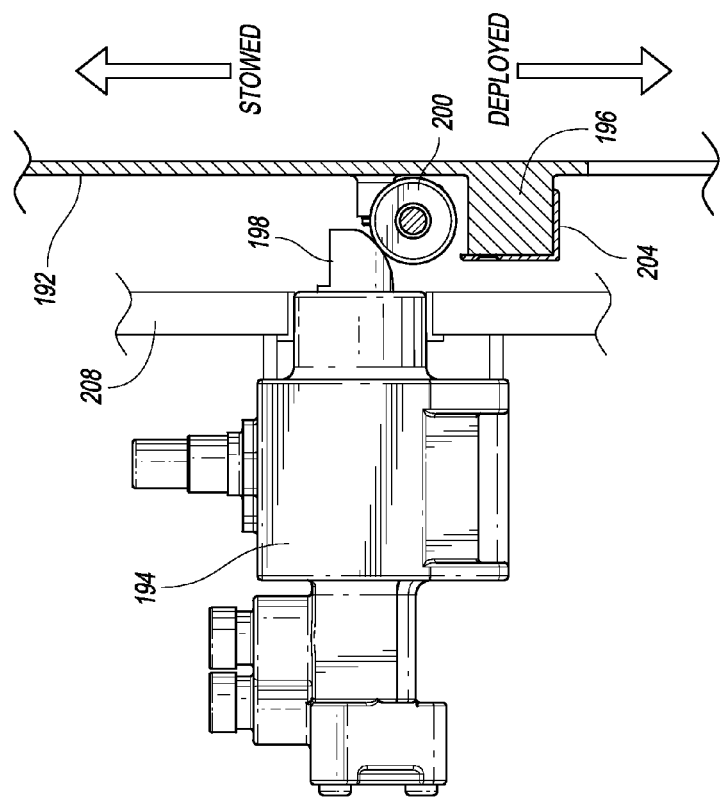
FIG. 7A is a partial cross-section view through FIG. 6B but includes the latch beam.
Figure 7C:
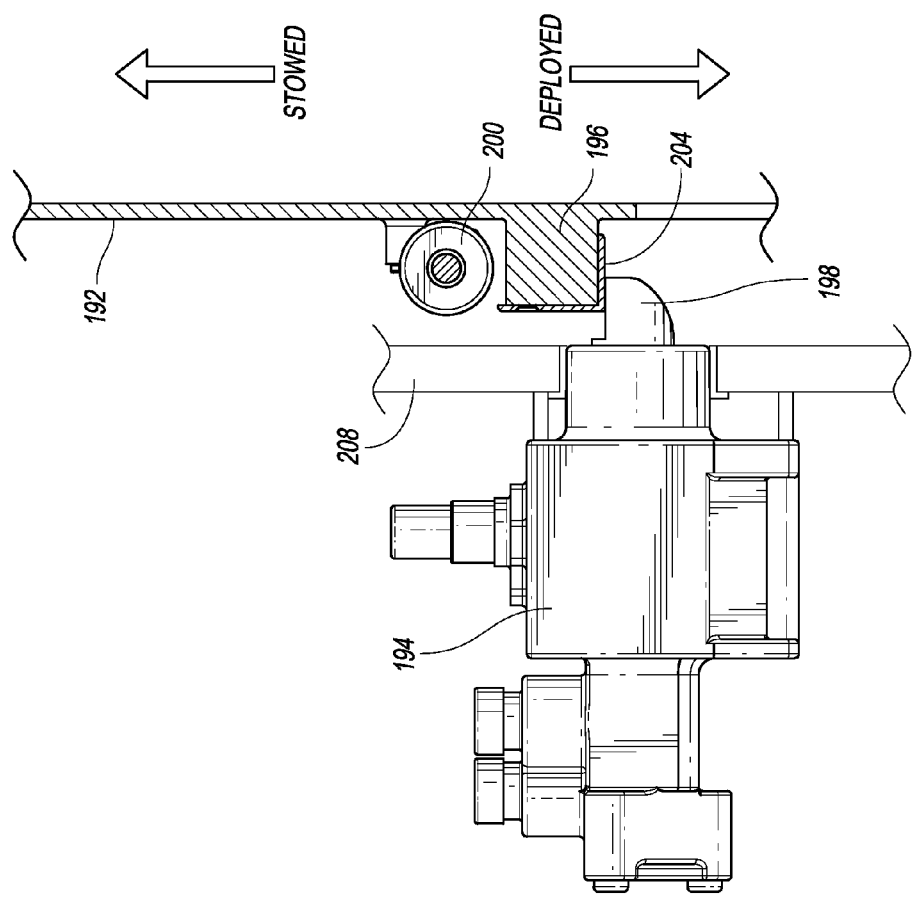
FIG. 7C is similar to FIG. 7B except that the translating sleeve closeout has reached the stowed position at which point the biasing spring in the actuator extends the lock pin and locks the translating sleeve in the stowed position.

FIG. 7A is a partial cross-section view through FIG. 6B that includes the latch beam 208 and shows the extended lock pin 198 in contact with the roller 200. FIG. 7B is similar to FIG. 7A except that the continued movement of the translating sleeve closeout 192 towards the stowed position has caused interference between the extended lock pin 198 and the roller 200. The interference results in the roller 200 exerting sufficient force on lock pin 198 to overcome the spring force exerted by the spring in the actuator 194 to force the lock pin 198 toward the unlock position. FIG. 7C is similar to FIG. 7B except that the translating sleeve closeout 192 has reached the stowed position at which point the biasing spring in the actuator 194 extends the lock pin 198 and locks the translating sleeve closeout 192 and associated translating sleeve 130 in the stowed position.

FIG. 8 is similar to FIG. 7A except that the roller 200 has a smaller diameter and is integral with the lock stop 196. FIG. 9 is similar to FIG. 8 except that the single roller 200 has been replaced with a plurality of rollers 212 having increasing diameters. The lock pin 198 will contact the plurality of roller 212 in series as the translating sleeve closeout 192 moves from the deployed position to the stowed position.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by any presented claims rather than by the foregoing description. All variations coming within the meaning and range of equivalency of presented claims are embraced within their scope.

What is claimed is:

1. A locking system for a cascade thrust reverser on a bypass turbofan comprising: a translating sleeve configured to move between a stowed position and a deployed position along a first linear axis; a lock member mounted to a beam and having a locking portion comprising a lock pin, the lock pin providing a contact surface and being movable between an extended position and a retracted position along a second linear axis perpendicular to said first axis, the lock pin being engageable with the translating sleeve to lock the translating sleeve in the stowed position when the lock pin is in the extended position and being disengageable from the translating sleeve to allow the translating sleeve to move toward the deployed position when the locking portion is in the retracted position; and at least one roller disposed so as to directly contact the contact surface of the lock pin when the lock pin is in the extended position and the translating sleeve moves from the deployed position to the stowed position, the at least one roller being rotatable along a third linear axis perpendicular to the first axis and the second axis, wherein in response to direct contact of the lock in against the at least one roller, rotation of the at least one roller against the contact surface of the pin retracts the pin from the extended position into the retracted position.

2. The system of claim 1, said locking portion further comprising an actuator comprising an internal spring in biasing engagement with the lock pin,
wherein the spring is configured to bias the lock pin towards the extended position and said actuator is configured to provide an opposing retracting force,
wherein absent retracting force from the actuator, the spring will extend said lock pin,
the actuator providing a primary retracting system and the roller providing an alternate secondary retracting system to overcome the force exerted by the spring in the actuator.

3. The locking system according to claim 1, wherein the translating sleeve comprises a closeout, and wherein the locking portion is engageable with a portion of the closeout at least when the translating sleeve is in the stowed position and the locking portion is in the extended position.

4. The locking system according to claim 3, wherein the portion of the closeout is a lock stop.

5. The locking system according to claim 3, wherein the translating sleeve comprises a slider, the closeout being supported by the slider.

6. The locking system according to claim 5, wherein the beam comprises a channel, and wherein at least a portion of the slider slides over the channel when the translating sleeve moves between the stowed position and the deployed position.

7. The locking system according to claim 1, wherein the contact between the roller and the lock pin at least partially retracts the lock pin.

8. The locking system according to claim 1, wherein the roller is mounted to the translating sleeve.

9. The locking system according to claim 1, wherein the at least one roller is configured to rotate when in contact with the lock pin.

10. A cascade type thrust reverser for an air duct of a turbofan engine comprising: a beam; a translating sleeve slidingly engaged with the beam so as to slide relative to the beam between a deployed position and a stowed position; a lock member supported by the beam and having a locking portion, the locking portion being movable between an extended position and a retracted position along a first linear axis, the lock member comprising an actuator including a biasing member in biasing engagement with the locking portion to bias the locking portion to the extended position; and a member mounted to the translating sleeve so as to rotate about a second linear axis, and retract the locking portion when the locking portion contacts the member and the translating sleeve slides towards the stowed position.

11. The thrust reverser according to claim 10, wherein the translating sleeve comprises a closeout, and wherein the locking portion is engageable with a portion of the closeout at least when the translating sleeve is in the stowed position and the locking portion is in the extended position.

12. The thrust reverser according to claim 11, wherein the portion of the closeout is an opening.

13. The thrust reverser according to claim 10, wherein the biasing member comprises a mechanical spring which biases the locking portion in a direction towards the extended position.

14. The thrust reverser according to claim 10, wherein the locking portion includes a chamfered surface which contacts the member.

15. The thrust reverser according to claim 10 further comprising a second member mounted to the translating sleeve so as to rotate about an axis parallel to said second linear axis and at least partially retract the locking portion when the locking portion contacts the second member and the translating sleeve is sliding towards the stowed position.

16. The thrust reverser according to claim 10, wherein the lock member is hydraulically actuated, and wherein hydraulic actuation of the lock member moves the locking portion towards the retracted position.

17. A cascade type thrust reverser for an air duct of a turbofan engine comprising: a fixed member; a translating member configured to move with respect to the fixed member between a deployed position and a stowed position; a lock member mounted to one of the fixed member and the translating member, the lock member having a locking portion, the locking portion being movable between a lock position and an unlock position along a linear axis, the lock member having a contact surface; and a member having a rotational axis and being mounted to the other one of the fixed member and the translating member, the member being configured to rotate and retract the locking member towards the unlocked position when the contact surface of the locking portion contacts the member and the translating member moves towards the stowed position.

18. The thrust reverser according to claim 17, wherein the translating member comprises a closeout, and wherein the locking portion is engageable with a portion of the closeout at least when the translating member is in the stowed position and the locking portion is in the lock position.

19. The thrust reverser according to claim 18, wherein the portion of the closeout is a lock stop.

20. The thrust reverser according to claim 18, wherein the portion of the closeout is an opening.

* * * * *

UNITED STATES PATENT AND TRADEMARK OFFICE
CERTIFICATE OF CORRECTION

PATENT NO. : 9,109,541 B2  
APPLICATION NO. : 13/664993  
DATED : August 18, 2015  
INVENTOR(S) : Martin Colin Channel Page 1 of 1

It is certified that error appears in the above-identified patent and that said Letters Patent is hereby corrected as shown below:

Claims

In column 9, line 47, Claim 1, please delete "in" and insert therefor --pin--.

Signed and Sealed this
Twenty-second Day of December, 2015

Michelle K. Lee
*Director of the United States Patent and Trademark Office*